March 31. 1925.  1,532,036
A. K. BUSHMAN
SYSTEM OF MOTOR CONTROL
Original Filed Aug. 15, 1922
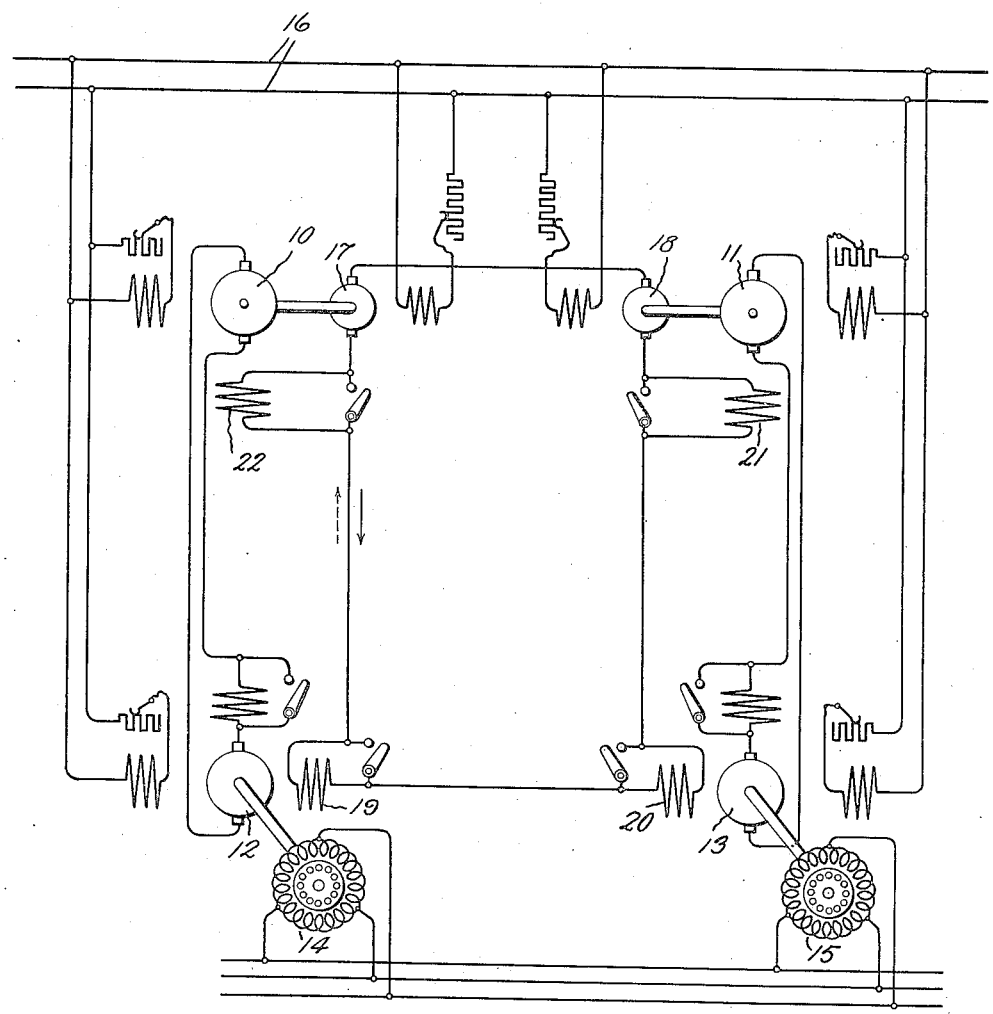
Inventor:
Andrew K. Bushman,
by
His Attorney Patented Mar. 31, 1925.

1,532,036

UNITED STATES PATENT OFFICE.

ANDREW K. BUSHMAN, OF SCHENECTADY, NEW YORK, ASSIGNOR TO GENERAL ELECTRIC COMPANY, A CORPORATION OF NEW YORK.

SYSTEM OF MOTOR CONTROL.

Application filed August 15, 1922, Serial No. 581,957. Renewed January 19, 1925.

*To all whom it may concern:*

Be it known that I, ANDREW K. BUSHMAN, a citizen of the United States, residing at Schenectady, county of Schenectady, State of New York, have invented certain new and useful Improvements in Systems of Motor Control, of which the following is a specification.

My invention relates to a system for maintaining a predetermined speed relation of a plurality of separate driving motors.

One of the objects of the invention is to provide an improved arrangement whereby when a portion of the driving motors varies from the proper speed so that the desired speed relation is varied, the speed of this portion of the motors is quickly varied in one direction and the speed of the remainder of the motors is quickly varied in the opposite direction so that the desired speed relation is quickly restored.

In carrying the invention into effect in one form, I provide a plurality of Ward Leonard units for driving the separate units of the machine to be driven. Connected to each of the separate motors of the Ward Leonard units is an exciter which is driven synchronously with its associated motor and which varies the excitation of the generators of the Ward Leonard units, or varies both the excitation of the generators and the motors of the Ward Leonard units, so as to restore the desired speed relation. The exciters are connected so that the generated voltages thereof normally oppose each other and the resultant voltage of the exciters occasioned by a speed variation of a portion of the motors from the predetermined speed relation, energizes controlling field windings of the Ward Leonard units so as to restore the desired speed relation. The regulating effect is thus very rapid and automatic.

For a better understanding of the invention, reference is had to the accompanying drawing which shows in very simplified diagram a system of control embodying the invention for the purpose of explaining the principles thereof.

Referring to the drawing, the separate electric driving motors 10 and 11 are adapted to be connected to the separate units of a machine (not shown) so as to drive the same. Each of these motors forms a part of a Ward Leonard unit, the generator 12 being connected so as to supply the armature current for the motor 10 and the generator 13 being electrically connected so as to supply the current for the armature of motor 11. The generators 12 and 13 may be driven in any suitable manner, as, for example, by means of the induction motors 14 and 15. The driving motors 10 and 11, as well as the generators 12 and 13, are separately excited from the excitation bus 16. Connected to the driving motor 10 is a separately excited exciter 17 which operates synchronously with the driving motor 10. The separately excited exciter 18 is similarly connected to the driving motor 11. These exciters are connected so that their generated voltages oppose each other and the resultant voltage, occasioned by one of the driving motors varying from the proper speed to maintain the desired speed relation between the driving motors, is used to regulate the Ward Leonard units so as to restore and automatically maintain the desired speed relation. For this purpose, field winding 19 of the generator 12, field winding 20 of the generator 13, field winding 21 of motor 11 and field winding 22 of motor 10 are arranged to be connected in the circuit in which the armatures of the exciters are included. Switch mechanism is provided as shown, so that the motor fields 21 and 22 or the generator fields 19 and 20 may be cut out of this circuit.

The operation of my invention, as thus constructed and arranged, is as follows:

Assume that the equipment is operating and that the field rheostats of the separately excited fields of the Ward Leonard units have been adjusted so that a predetermined speed relation is established between the driving motors 10 and 11, and that it is desired that this speed relation be automatically maintained. The rheostats in the separately excited fields of the exciters 17 and 18 will be adjusted so that while the driving motors are maintaining the desired speed relation, the voltages of the exciters 17 and 18 will be practically the same. The field windings 19, 20, 21 and 22 may now be connected so as to be included in the armature circuit of the two exciters. Assume that the driving motor 10 decreases in speed so that the voltage generated by the exciter 17 will be less than that generated by the exciter 18. This will cause a current to flow from the exciter 18, through the exciter armature 17, fields 22, 19, 20 and 21 in a direction as indicated by the full line arrow. The field winding 22 of the driving motor 10 will be energized in such a direction that this winding will oppose the flux set up by the separately excited field of the motor 10, the field winding 19 of the generator 12 will be energized to set up a flux which will assist the separately excited field of this generator, the field winding 20 of the generator 13 will be energized to set up a flux in opposition to the separately excited field of this generator, and the field winding 21 of the motor 11 will be energized to set up a flux which is cumulative with respect to the separately excited field of this driving motor. This will have the effect of increasing the speed of the driving motor 10 by weakening its field excitation and by increasing the voltage impressed on its armature by the increase of the voltage of the generator 12, and the speed of the driving motor 11 will be reduced by reason of the fact that the effective field flux of this driving motor is increased and the voltage impressed on its armature by the generator 13 will be reduced. A balance is very quickly restored and automatically maintained. In case the speed of the driving motor 10 should increase, exciter 17 will generate a higher voltage than the exciter 18 and a current will flow in the exciter armature circuit in the direction indicated by the dotted line arrow. This will have the effect of increasing the effective field flux of the driving motor 10, the voltage impressed on the armature of this driving motor by means of the generator 12 will be reduced, the effective field flux of the driving motor 11 will be reduced and the voltage impressed on the armature of this driving motor by the generator 13 will be increased. The speed of the driving motor 10 will thus be reduced and the speed of the driving motor 11 will thus be increased so that the predetermined speed relation of the driving motors is thus quickly restored and automatically maintained. It will be obvious from the explanation previously given that the exciter 18 operates in a similar manner to the exciter 17 in the controlling of the field excitation of the motors and generators of the Ward Leonard units so as to automatically maintain the predetermined speed relation of the motors.

If desired, fields 22 and 21 of the driving motors may be cut out of the regulating circuit, the regulation being affected solely by the control of the potential of the generators of the Ward-Leonard units. Likewise, the fields 19 and 20 of the generators may be cut out of the regulating circuit so that the regulating effect is obtained solely by means of the field windings 22 and 21. However, by regulating the field excitation of both the generators and the motors of the Ward Leonard units, I am able to obtain a quicker and more effective action in regulating the speeds of the driving motors so as to maintain the predetermined speed relation. That is because of the fact that the regulation of the field of a driving motor and the regulation of the field of its associated generator produce the same effect, in the control of the speed of the driving motor and the effects act cumulatively.

In accordance with the provisions of the patent statutes I have described the principle of operation of my invention together with the apparatus which I now consider to represent the best embodiment thereof, but I desire to have it understood that the apparatus shown is only illustrative and that the invention may be carried out by other means.

What I claim as new and desire to secure by Letters Patent of the United States, is:—

1. In a system for maintaining a predetermined speed relation of a plurality of separate driving motors, a separate generator for supplying the power for each of the said driving motors, a separate exciter for each of the said driving motors connected to operate synchronously with its respective driving motor, means controlled by the said exciters for varying the speeds of the said motors to preserve the predetermined speed relation, and connections whereby the voltages of the said exciters oppose each other.

2. In a system for maintaining a predetermined speed relation of a plurality of separate driving motors, a separate generator for supplying the power for each of said driving motors, a separate exciter connected to operate synchronously with its respective driving motor, each of the said generators having a controlling field winding connected to be energized by the said exciters, and connections whereby the voltages of the said exciters oppose each other and the resultant voltage of the exciters occasioned by the variation of the speed of a portion of the said motors from the predetermined speed relation energizes the said controlling field windings to produce a speed change of the said portion of the motors in one direction and a speed change of the remainder of the motors in the opposite direction to restore the predetermined speed relation of the motors.

3. In a system comprising a plurality of Ward-Leonard units, means for maintaining a predetermined speed relation of the separate driving motors of the said units, comprising a separate exciter connected to operate synchronously with its respective driving motor, each of the generators and each of the motors of the said units having a controlling field winding connected to be energized by the said exciters, and connections whereby the voltages of the said exciters oppose each other and the resultant voltage of the exciters occasioned by the variation of the speed of a portion of the said motors from the predetermined speed relation energizes the said controlling field winding to produce a speed change of the said portion of the motors in one direction and a speed change of the remainder of the motors in the opposite direction to restore the predetermined speed relation of the motors.

In witness whereof, I have hereunto set my hand this 14th day of August, 1922.

ANDREW K. BUSHMAN.